United States Patent [19]
Margittai

[11] 3,837,388
[45] Sept. 24, 1974

[54] EVAPORATOR APPARATUS

[76] Inventor: Thomas Margittai, 778 Cornwall Drive, State College, Pa. 16801

[22] Filed: Dec. 21, 1972

[21] Appl. No.: 317,423

[52] U.S. Cl............. 159/13 R, 159/6 W, 159/25 A
[51] Int. Cl.......................... B01d 1/22, B01d 1/00
[58] Field of Search............................... 159/32–34, 159/4 SR, 37, 40, 25 A, 28 R, 6 W, 13 R, 22, 23, 14; 165/107, 108; 99/134, 403; 127/28; 23/290.5

[56] References Cited
UNITED STATES PATENTS

| | | | |
|---|---|---|---|
| 219,411 | 9/1879 | Pond | 159/25 A X |
| 338,583 | 3/1886 | Burkhardt | 159/25 A UX |
| 509,962 | 12/1893 | Sperry | 159/25 A |
| 1,040,427 | 10/1972 | Savage et al. | 159/33 X |

FOREIGN PATENTS OR APPLICATIONS

| | | | |
|---|---|---|---|
| 820 | 6/1895 | Denmark | 159/6 W |
| 287,198 | 3/1928 | Great Britain | 252/371 |

Primary Examiner—Jack Sofer
Attorney, Agent, or Firm—Philip G. Hilbert

[57] ABSTRACT

An evaporator apparatus of the thin film type having a structure and a mode of operation such that the amount of liquid to be concentrated in the evaporator is minimal, as compared to the total evaporating capacity of the apparatus; such evaporator comprising a plurality of spaced, nesting cup shaped heat transfer members to provide cup shaped spaces therebetween for (1) admitting a heating medium to the space therebetween; (2) passing liquid to be concentrated upwardly over heated, rapidly increasing surface areas; and (3) passing the concentrated liquid downwardly over heated, rapidly decreasing surface areas to a product outlet.

8 Claims, 3 Drawing Figures

EVAPORATOR APPARATUS

BACKGROUND OF THE INVENTION

Evaporators known in the art take several forms including the tube type, the cylinder type, and the like. Such known evaporators, due to their configuration and mode of operation, necessarily have limited flexibility in use. Thus, to obtain any substantial product concentrate output such as orange juice concentrate, milk concentrate, tomato paste concentrate, etc., substantial amounts of tubing or other heat transfer surface equipment and substantial liquid volume is required. Obviously, the capital expense for such an installation is quite high.

Further, with known evaporator constructions, it is extremely difficult to keep the apparatus clean and their structure does not facilitate cleaning operations. When processing heat sensitive foods and drugs, any residual matter on the heated surfaces of the evaporator will adversely affect the liquid being concentrated.

Accordingly, an object of this invention is to provide an improved evaporator apparatus of the character described which has a construction and mode of operation such that the evaporator capacity is vastly increased in relation to the size of the apparatus and the floor space required therefor, thereby materially reducing capital costs and space requirement for a given concentrate output.

Another object of this invention is to provide an evaporator apparatus of the character described, which comprises essentially a plurality of nesting, spaced cup-shaped evaporator assemblies; the liquid input being passed over heated surfaces of very rapidly increasing surface area into a narrow space of highly reduced volume, to thereby markedly increase the evaporative capacity of the apparatus.

A further object of this invention is to provide an evaporator apparatus of the character described, wherein the respective assemblies are separably interconnected for operation yet permitting rapid disassembly thereof to allow for easy cleaning of the heat transfer surfaces of the cup-shaped members.

Still a further object of this invention is to provide an evaporator apparatus of the character described, wherein the geometric configuration of the cup-shaped evaporator members permits the fabrication thereof from stainless steel sheet of a thickness materially less then that used in conventional thin film evaporators, thereby effecting a further saving in production costs.

Yet another object of this invention is to provide an improved evaporator construction, which is of relatively simple structure, readily fabricated, operating with highly increased efficiency, allowing for quick disassembly for cleaning and reassembly, and leading to decreased capital costs and space requirements.

DESCRIPTION OF THE PREFERRED EMBODIMENT

Figure 1:
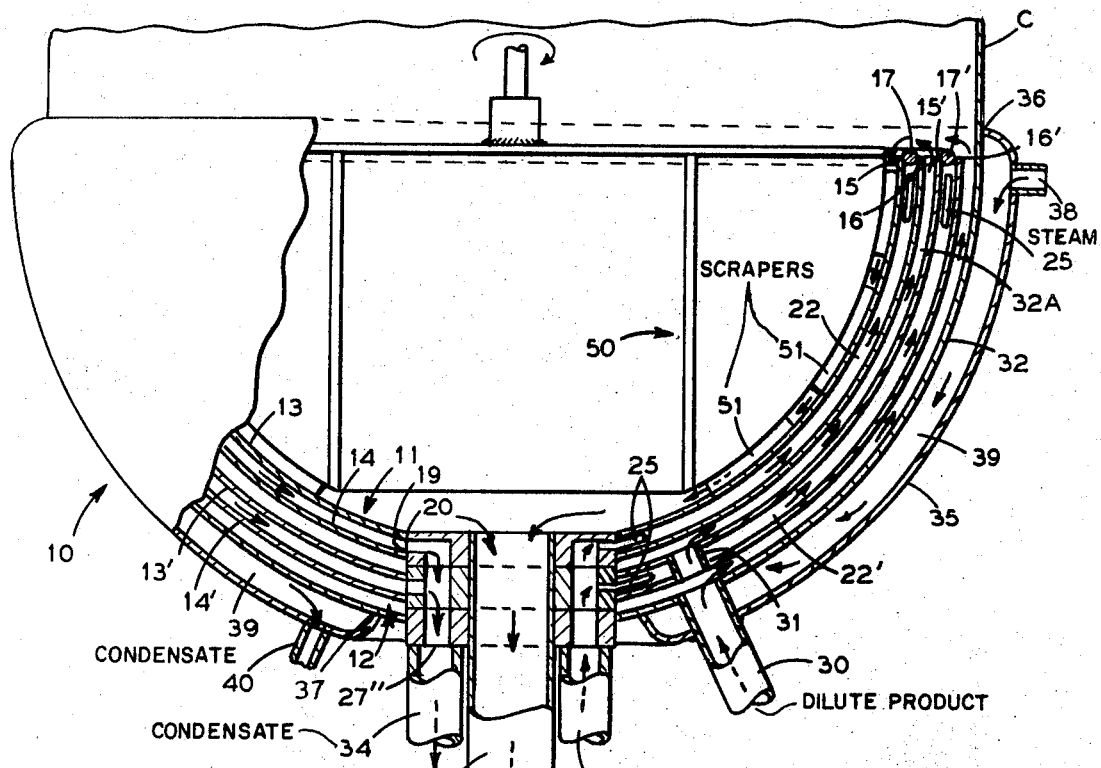
FIG. 1 is a side elevational view of an evaporator apparatus embodying the invention, with parts in section.
Figure 2:
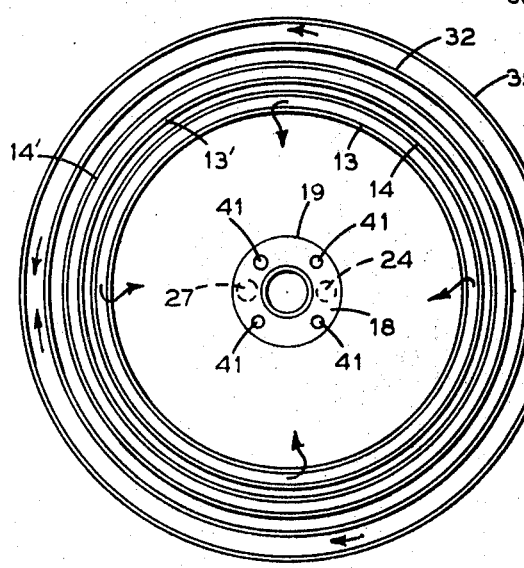
FIG. 2 is a top plan view thereof.
Figure 3:
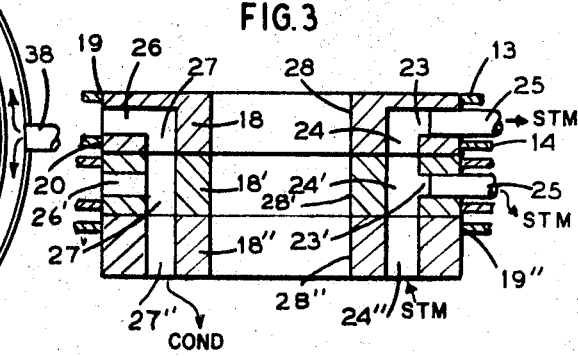
FIG. 3 is a sectional view of an element of the evaporator apparatus

The evaporator apparatus of the instant invention comprises a plurality of nesting, spaced, evaporator assemblies; where each assembly comprises a pair of nesting, spaced cup-shaped members which are held in their spaced relation by a peripheral spacer-seal at the rim thereof and a flangelike spacer and manifold member at the central bottom portions thereof.

Further, the flangelike member provides passages for (1) admitting a heating medium such as steam to the space between the pair of cup shaped members; (2) passing steam condensate outwardly thereof; and (3) a product outlet. Also, the nested assemblies are arranged with their flangelike spacers in superposed relation; the respective passages being in registry; Bolts are provided for securing the assemblies together, yet allowing for disassembly thereof to permit cleaning of the individual assemblies and reassembly thereof.

Thus, as shown in the drawing, 10 designates an evaporator apparatus of the instant invention. The same is constituted of a pair of nesting, cup-shaped assemblies, generally indicated at 11, 12. While only two such assemblies are shown, it is understood that apparatus 10 may comprise 3, 4 or more such assemblies, as desired.

The innermost assembly 11 comprises a pair of cup-shaped members 13, 14 formed from stainless steel sheet of suitable gauge. Members 13, 14 are nested to bring their respective rims 15, 16 in opposed relation and joined together by an annular spacing and sealing member 17 to which rim edges 15, 16 are welded. Member 17 may be of solid or tubular metal.

The members 13, 14 are further interconnected at their bottom, central portions by a circular flangelike plate 18 which is located in a pair of centrally disposed, aligned openings 19, 20 formed in the members 13, 14 respectively. The peripheral edge of plate 18 is welded to the edges defining openings 19, 20 in members 13, 14.

The cuplike space 22 between members 13, 14 provides a heating chamber by the way of steam or other heating medium admitted thereto. Accordingly, plate 18 is formed with a right angle passage having a lateral portion 23 and a depending portion 24. Preferably, a single steam conducting tubing 25 is located in space 22; the lower end of tubing being welded to the peripheral edge of plate 18 for communication with passage portion 23.

The upper end of tubing 25 terminates adjacent spacer seal 17 and the steam emitted from said upper tubing end fills the heater space 22. The plate 18 is further formed with a condensate outlet passage having a lateral portion 26 and a depending portion 27. Steam condensate can pass from space 22 outwardly by way of passage portions 26, 27.

Plate 18 is further formed with a central opening 28 into which is fitted an outlet tube 29 by which liquid concentrate may pass outwardly of apparatus 10, as described in detail hereinafter. Liquid to be treated and concentrated is introduced by way of tubing 30 and an aligned collar 31 which communicates with the cuplike space 32A between assemblies 11, 12.

The outer assembly 12 is substantially similar to assembly 11; including a pair of cup shaped members 13', 14' in nested relation and having a spacing and sealing member 17' welded to their rims 15', 16'. Also, a flangelike spacer plate 18' connect the central bottom portions of members 13', 14', as described in connection with plate 18. Plate 18' is formed with a pair of T shaped passages, each including through vertical portions 24'; 27' and lateral portions 23'; 26'.

The lateral passage portions 23'; 26' communicate with heating space 22' between members 13', 14' while vertical passage portions 24', 27' register with passage portions 24, 27 respectively. Thus, this steam is also admitted to space 22' and condensate may be removed from space 22'.

The evaporator assemblies 11, 12 are located within a casing C and in concentric relation to wall portion 32 thereof. A flangelike plate 18'' is disposed in a central lower portion of wall portion 32 being welded to a circular edge of an opening 19'' formed in said wall portion. Plate 18'' is formed with through openings 24'', 27'' which register with openings 24', 27' respectively, in plate 18'. A steam inlet tube 33 is suitably connected to the lowermost plate 18'' to communicate with passages 24'', 24' and 24 to thereby admit steam to spaces 22, 22'. Similarly, a condensate outlet tube 34 is suitably connected to the plate 18'' for communication with registering passages 27'', 27' and 27 to pass condensate outwardly of apparatus 10.

A steam chest is formed in respect to casing wall portion 32. To this end, a cup shaped member 35 is disposed concentrically and outwardly of casing wall portion 32 with an inturned rim portion 36 suitably secured to upper portions of casing wall portion 32. An inturned annular rim portion 37 at the lower end of member 35 is suitably secured to casing wall portion 32. A steam inlet tube 38 adjacent rim 36 admits steam to space 39 between casing wall portion 32 and member 35; and a condensate outlet tube 40 adjacent rim 37 passes steam condensate outwardly from space 39.

Plates 18' and 18'' are also formed with central openings 28'; 28'' respectively for registry with opening 28 in plate 18 and to pass outlet tube 29 therethrough.

Liquid inlet tubing 30 passes through aligned openings in member 35 and casing wall portion 32 whereby to pass liquid to be treated into the cuplike space between assembly 12 and casing wall portion 32. Collar 31 allows further liquid to be treated to pass upwardly in the cup shaped space between assemblies 12, 13.

The plates 18, 18' and 18'' are secured together by bolts not shown, which pass through sets of registering openings 41 in said plates. Openings 41 may be in quadrangular relation.

In using the apparatus 10, it will be apparaent that liquid to be concentrated is pumped by way of inlet tubing 30 and collar 31, to flow upwardly in the space between assemblies 11, 12 and the space between assembly 12 and casing wall portion 32 and in contact with the heated surfaces defining said spaces. By virtue of the cup shaped assemblies, the heated surface area increases rapidly to effect maximum heat transfer to the liquid being concentrated.

The rising liquid being treated, spills over the rim portions of assemblies 11, 12 to make film contact with the exposed surface of assembly 11 and to move downwardly toward outlet tube 29.

For certain condensates, scraping means may be required. Accordingly, a scraper frame 50 is suitably mounted for rotation on apparatus 10, by motor means, not shown. Scraper members 51 are located on frame 50 for contact with the outer surface of member 13 of assembly 11.

It is understood that suitable gaskets, not shown, may be disposed between the plates 18, 18' and 18''; the gaskets being suitable formed with openings for registering with the several passages therein.

I claim:

1. An evaporator comprising a cup shaped evaporator assembly, said assembly comprising a pair of nesting cup shaped members in spaced relation to each other, means for interconnecting the spaced rim portions of said nesting members, means for introducing a steam heating medium in the space between said nesting members, means for introducing a dilute liquid product to be concentrated into contact with the outer heated surface of the outer of said nesting members and the inner surface of a third nesting cupmember for heating said dilute liquid product as the heated product rises upwardly toward the rim of said outer nesting member of said pair and thereafter spills over said rim and thence flows downwwardly into contact with the outer surface of the inner of said pair of nesting members to produce a concentrate, condensate outlet means communicating with the space between said first pair of nesting members for drawing off steam condensate, and outlet means for drawing off said concentrate from said innermost cup shaped member.

2. An evaporator as in claim 1, wherein a second cup shaped evaporator assembly comprising also said third nesting cup member is disposed in nested relation to said one cup shaped evaporator assembly, means for separably connecting said assemblies together, said connecting means comprises a pair of plates respectively associated with said assemblies, each of said plates being located at the lower end of the nested members of the assembly associated therewith, each plate being formed with inlet steam admitting passages in registry with said means for introducing heating medium and also having outlet steam condensate passageways in registry with the space between said pair of nesting cupshaped members.

3. An evaporator as in claim 1 wherein said nesting members are formed with aligned openings at the central bottom portions thereof, plate means fitted into said aligned openings in said members, said plate means comprising said means for introducing heating medium and being formed with an inlet passage communicating with the space between said pair of nesting members for passing steam as said heating medium therethrough into said space and being also provided with said condensate outlet means.

4. An evaporator as in claim 3, wherein said plate means is formed with an opening for passing said concentrate outlet means therethrough.

5. An evaporator comprising a plurality of cup shaped evaporator assemblies in nesting relation to each other, each assembly comprising a pair of cup shaped members in nested relation to each other with rimmed openings in the bottom thereof, first spacer means sealingly interconnecting the upper rim portions of each pair of nesting members, and second spacer means sealingly connecting the bottom rim portions of each said pair of nesting members and each pair of nesting assemblies, said second spacer means being formed with inlet passageways for admitting steam to the space between each said pair of nesting members, inlet means for admitting a product to be concentrated into the space between each pair of said evaporator assemblies, and condensate outlet means in each said second spacer means communicating with the space defined by each pair of nesting cup shaped members of an assembly.

6. An evaporator as in claim 5 wherein the second spacer means of each assembly comprises a plate, and means for separably connecting the plates of said assemblies in superposed relation, to allow for disassembly of said evaporator assemblies.

7. An evaporator as in claim 6, wherein each plate is formed with a said inlet pasaageway for admitting steam as heating medium to the space between the pair of nesting members of the assembly associated with said plate, and steam conduit means in said last mentioned space connected at one end thereof with the passageway in said plate, the other end of said conduit means terminating adjacent the first spacer means.

8. An evaporator as in claim 7, wherein said product inlet means comprises conduit means extending transversely thru and isolated from the pair of nesting members for communication with the space between a pair of adjacent assemblies.

* * * * *